United States Patent [19]
Renda

[11] 4,351,289
[45] Sep. 28, 1982

[54] WATER INJECTION SYSTEM FOR INTERNAL COMBUSTION ENGINES

[76] Inventor: Vince A. Renda, 6325 Winthrop, Detroit, Mich. 48228

[21] Appl. No.: 175,608

[22] Filed: Aug. 6, 1980

[51] Int. Cl.³ .................. F02D 19/00; F02M 25/02
[52] U.S. Cl. .................. 123/25 A; 123/25 J; 123/25 L; 123/25 K
[58] Field of Search ............ 123/25 R, 25 A, 25 L, 123/25 B, 25 P, 25 J, 25 K

[56] References Cited

U.S. PATENT DOCUMENTS

| | | | |
|---|---|---|---|
| 3,856,901 | 12/1974 | Neumann et al. | 261/18 |
| 3,911,871 | 10/1975 | Williams et al. | 123/25 L |
| 3,970,052 | 7/1976 | Andoh | 123/25 |
| 3,987,774 | 10/1976 | Waag | 123/25 R |
| 4,011,843 | 3/1977 | Feuerman | 123/119 |
| 4,023,538 | 5/1977 | Harpman et al. | 123/3 |
| 4,027,630 | 6/1977 | Giardini | 123/25 P |
| 4,046,119 | 9/1977 | Perry | 123/119 |
| 4,068,625 | 1/1978 | Brown | 123/25 |
| 4,096,829 | 6/1978 | Spears | 123/25 L |
| 4,141,323 | 2/1979 | Hart | 123/25 B |
| 4,167,919 | 9/1979 | Woolley et al. | 123/1 |
| 4,191,134 | 3/1980 | Goodman | 123/25 |
| 4,240,380 | 12/1980 | Slagle | 123/25 A |

OTHER PUBLICATIONS

Adair Company, publication "Add Wings to Your Car".

*Primary Examiner*—Ira S. Lazarus
*Attorney, Agent, or Firm*—Krass, Young & Schivley

[57] ABSTRACT

Water injection is carried out in a pressure system, with water from a reservoir pressurized by an injection pump energized only above predetermined torque demand levels, under the control of a vacuum switch sensing intake manifold vacuum. Water injection is also precluded until the engine reaches operating temperature by a vacuum switch connected to a PVS valve. A water spray nozzle is mounted in the air cleaner and directs droplets into the carburetor intake. A purging pump causes purging of a short section of the feed line upstream of the injection nozzle after the engine is shut off to minimize water drippage into the engine carburetor.

10 Claims, 2 Drawing Figures

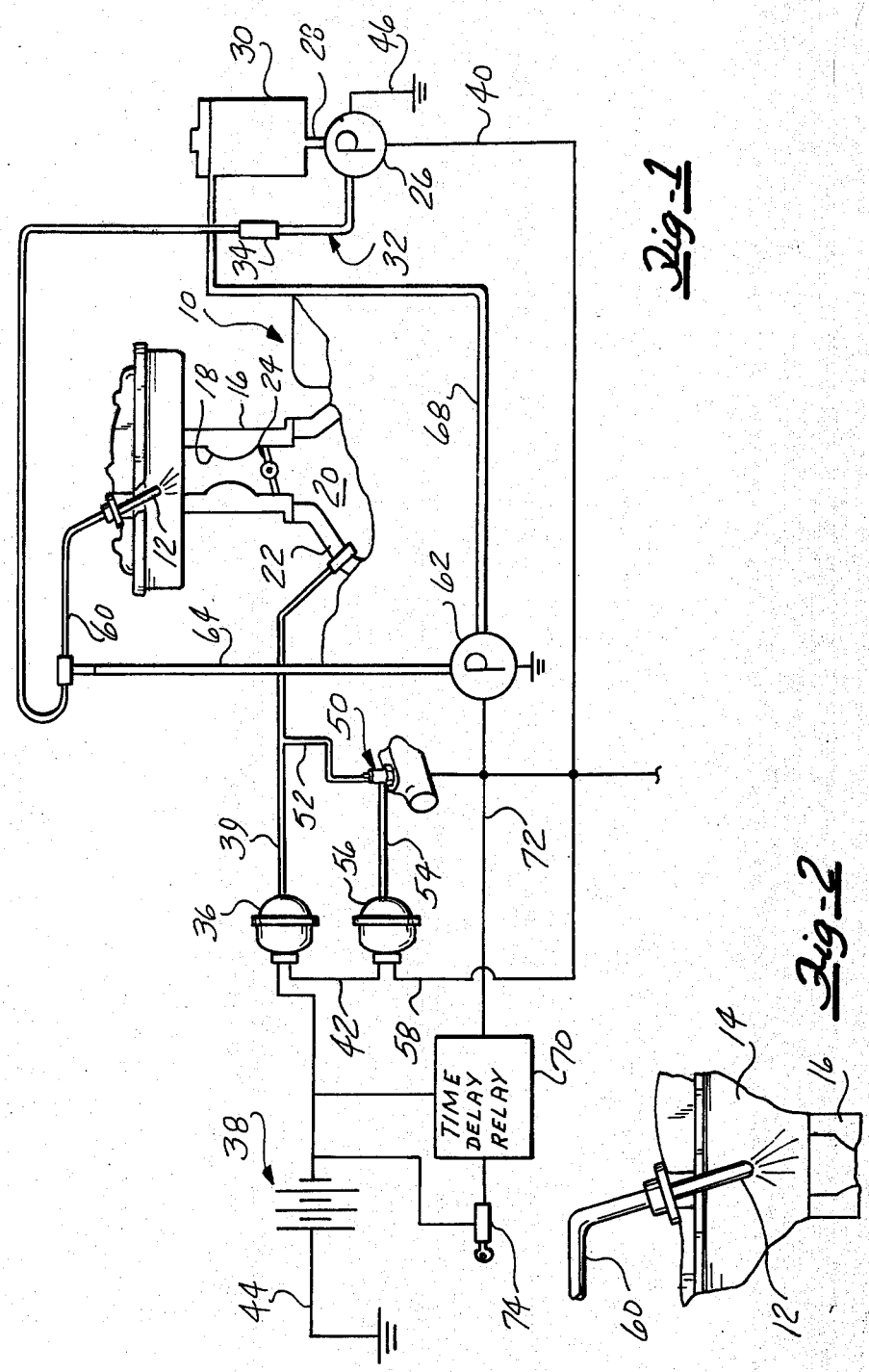

WATER INJECTION SYSTEM FOR INTERNAL COMBUSTION ENGINES

BACKGROUND DISCUSSION

This invention concerns internal combustion engines and more particularly water injection systems for piston engines having air induction systems. There are currently great efforts being exerted to improve the efficiency of operation of internal combustion engines by improving the fuel economy. Such efforts have been made more difficult by the need to maintain certain maximum engine emissions of such pollutants as nitrogen oxide (NOX). Such emissions are produced at relatively elevated engine combustion chamber temperatures.

In an effort to reduce such combustion chamber temperatures, the engine timing has commonly been retarded by manufacturers. While this reduces the combustion chamber temperatures and thus the NOX emissions, it also leads to less efficient engine operation and poorer mileage.

Much of the currently available gasoline fuels are of low octane ratings due to the elimination of lead. Such lower octane ratings result in a tendency for engine knock under heavy load conditions.

This factor also requires relatively retarded engine timing and hence also adversely effects economy of operation.

There is also a tendency for carbon deposits to build up in the engine cylinder on the piston surfaces and spark plugs which increases the tendency for knock and dieseling, and also decreases ignition reliability, all of which adversely affect engine economy.

It has heretofore been known that injection of water in the form of an atomized spray tends to reduce the temperature of combustion within the engine cylinders, reducing the tendency for knock and lowering the temperature levels even at relatively advanced engine timing, such that knocking and the formation of pollutants is reduced.

Overall smoother engine operation results and has a side benefit that the tendency for carbon deposit buildup is reduced, thus tending to alleviate the problems described above and enabling lower octane fuel to be employed as well as the engine timing to be advanced.

However, water injection systems, while long known, have not heretofore found wide application. Water injection, with nonknocking load mixtures, tends to reduce the power output and adversely effect operating economy under these circumstances.

Also, water entering the engine under circumstances has a tendency to produce rusting of the engine components, particularly the carburetor throttle plate, if injection is taking place above the carburetor. Again, entry of water into the engine at relatively low temperatures increases the possibility of icing, hard starting and poor drivability until the engine warms up.

There has heretofore been provided drain means associated with injection apparatus enabling the water to be drained from the system and precluding its seepage into the engine with engine operation ceased. Also, there has heretofore been employed oil pressure switches associates with the injection which precludes the flow of water into the injection system except with the engine in operation.

These measures, however, do not preclude some leakage of water into the engine and also allow water to be injected at relatively low engine operating temperatures. Also, complete draining of the injection system produces an undesirable lag in the initiation of water injection after a cycle or when the engine operation has ceased and water is drained from the system.

It is also highly desirable that such water injection systems, in order to be readily retrofitted, be relatively simple and inexpensive as well as easily installed without major modifications or complicated installation requirements.

Another drawback of such prior art water injection systems is in the relatively large volume of water consumed by the system requiring bulky water tanks or very frequent filling of the reservoir tanks increasing the service requirements associated with vehicle operation.

Accordingly, it is an object of the present invention to provide a water injection system which is highly efficient in operation, achieving a net increase in the operating efficiency of the engine by enabling advance of the engine timing to optimal levels.

It is a further object of the present invention to provide a water injection system which precludes the leakage of water into the engine whenever the engine is not in operation or when the engine is operating cold, i.e., under the normal operating temperature of the engine.

It is another object of the present invention to provide a water injection system in which the water consumption is minimal such as to minimize the need for water reservoir capacity and/or periodic filling.

It is still another object of the present invention to provide such system in which the carbon removal effects of water injection are enhanced such that upon retrofit of such system, the carbon removal progresses at a relatively rapid rate.

It is yet another object of the present invention to provide such arrangement which is relatively simple and low in cost, and adapted to retrofitting to existing nonequipped automobile engines.

SUMMARY OF THE INVENTION

These and other objects of the present invention, which will become apparent upon a reading of the following specification and claims, are achieved by a water injection system utilizing pressurized injection flow to a spray nozzle mounted in the engine air cleaner directing a droplet spray into the carburetor intake. Flow is controlled by an electrically operated injection pump causing water injection only with the pump energized, injection ceasing upon deenergization of the injection pump. Pump energization in turn is controlled by a control circuit in which injection is enabled only for relatively high torquedemand conditions in the engine, i.e., those levels most likely to produce engine knock such that the water injection may alleviate the tendency for knock to enable the engine timing to be advanced without producing knock and to minimize the formation of nitrogen oxide.

Injection is also precluded whenever engine temperatures are below the normal operating temperature such as to preclude water injection with a cold engine.

Control over injection flow is carried out in the disclosed embodiment by a vacuum switch which is connected to the intake manifold vacuum such as to be placed in series with the power circuit for the injection pump, such that until the vacuum declines below a certain level, the pump is deenergized and is not energized until relatively high engine vacuums are reached, indicating a high torque demand.

Similarly, a vacuum switch is also associated with the water jacket mounted PVS valve and in series with the power circuit to the injection pump to preclude injection except when the engine has reached its normal operating temperature.

As noted, the pressurized injection system precludes flow of water to the injector nozzle except when the pump is energized, but in order to preclude seepage or dripping from the nozzle when the engine is not in operation, a purging system is incorporated which evacuates the nozzle and a short section of the feed passage upstream of the nozzle after the engine is shut off.

This precludes such leakage into the engine with the engine not in operation and at the same time allows rapid start up of injection of the next injection cycle due to the relatively small volume evacuated from the system.

The purging arrangement includes a purge pump which is energized by means of a time delay relay activated in turn when the ignition key is turned off which causes energization of the purge pump for short intervals, i.e., on the order of 10 seconds, after each time the engine is shut off.

The purge pump has its intake side connected with a Tee in the feed passage located a short distance upstream from the injection nozzle, such as to withdraw the water from the passage and the injector nozzle and return it to the water reservoir. In the pressurized system disclosed, the water in the remainder of the feed passage is prevented from advancing past the Tee and thus eliminates seepage into the engine and minimizes any tendency for formation of rust.

The injector nozzle itself is mounted inclined within the engine air cleaner directing the water spray down into the venturi of the engine carburetor for those systems supplied with the purge feature and for those systems without a purge feature, an alternate embodiment is disclosed in which the injector nozzle is inclined more steeply from the vertical to reduce the tendency for drip on to the carburetor throttle plate.

The injector nozzle itself is of the type which directs a spray of water droplets rather than an atomized or vaporized spray. This water droplet injection has been found to accelerate the decarbonizing effect of water injection in engines which have been carbonized by operation without water injection.

DESCRIPTION OF THE DRAWINGS

FIG. 1 is a diagrammatic representation of a water injection system according to the present invention.

FIG. 2 is a fragmentary view of an alternate embodiment in which the injection nozzle is mounted at an angle reducing the steep angle to the horizontal to reduce the tendency for seepage into the engine with operation without a purge feature.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

As described above, the water injection system according to the present invention is designed to be associated with an internal combustion piston engine shown fragmentarily at 10 of the type having an air induction system controlled with a throttle valve. Injection is carried out by an injector nozzle 12 mounted in the engine air cleaner 14 and extending downwardly at approximately a 45° angle such as to direct the injection spray into the carburetor 16 such as to pass into the venturi section 18 and thence into the interior 20 of the intake manifold 22.

Injector nozzle 12 is of a type which produces the spray of water droplets rather than an atomized or vaporized spray, which it has been discovered produces a more rapid carbon removal effect than with atomized or vaporized injection spray nozzles which are typical of the prior art.

Such a nozzle is of the type utilized in installations for fire extinguishing sprays and the like and suitable such nozzles are commercially available from Spraying Systems, Model No. 6471-A-400.

The throttle plate 24, positioned beneath the venturi section 18, acts to meter the air inducted into the internal combustion engine in a manner well known in the art. For carbureted engines, fuel in the proper mixture is drawn into the air flow by metering jets in a manner well known in the art.

The present invention also has application to other types of fuel supply systems, i.e., such as fuel injected or supercharged engines, as long as there is an air induction system into which the water spray may be directed.

According to the concept of the present invention, the injection of water does not occur during all engine operating conditions, but only upon the sensing of a torque demand level indicating heavy engine load. The water injection has been found to substantially achieve the advantages described above with such part-time operation. It is most required and desirable during engine operating conditions tending to produce engine knock, i.e., under high load conditions. The means for controlling the water injection consists of pumping means comprised of an injection pump 26 adapted to receive via intake 28 a water supply from reservoir means 30. Due to such part-time operation, a relatively low volume reservoir means 30 may be provided, i.e., a two-quart reservoir for normal operating conditions.

The system is designed to be activated only when injection pump 26 causes pressurization of water received from the reservoir means 30. The pump outlet is connected to the injection nozzle 12 by passage means generally indicated at 32 which, due to air block and the restrictive effect of the injection nozzle, allows a flow of water in the passage means 32 only when the injection pump 26 is activated.

Accordingly, whenever the injection pump 26 is unenergized, water injection ceases.

A suitable filter 34 may be provided in the passage means 32 to prevent clogging of the injection nozzle 12 and entry of foreign articles into the nozzle or the engine itself.

Control means are provided for precluding energization of the injection pump 26 except when the torque level is above the predetermined level. Such control means includes a vacuum switch 36 of a suitable commercially available design which senses vacuum via pressure tap 39 which in turn is connected to the interior of the intake manifold 22. Such control means are available from Borg-Warner, Model No. Sketch 101.

As is well known, this constitutes means for sensing the torque demand level.

Other appropriate means could be provided such as a mechanical throttle position linkage. The vacuum switch 36 is placed in series with the battery 38 and the terminal 40 of the injection pump 26.

The injection pump 26, as noted, is electrically operated and may be of the type commonly employed in automotive applications for windshield wiper washing sprays and is caused to receive power from the battery 38 when the control circuit is in an enabling condition.

Accordingly, only when the vacuum switch 36 senses a predetermined vacuum level is the intermediate line 42 electrically connected with the battery 38. A suitable grounded circuit including ground lines 44 and 46 is employed in the manner well known in the art.

According to a second aspect of the present invention, there is also included in the control means a temperature sensing means which also precludes activation of the injection pump 26 and the initiation of water injection until the engine has reached its normal operating temperature level. This obviates the difficulties of hard starting and the corrosive effects of injecting water into a cold engine.

Such temperature sensing means advantageously can include a PVS valve 48 which is commonly incorporated into many modern engine designs. Such PVS valve 48 is placed into the engine water jacket and a portion thereof protrudes into the water jacket, indicated at 50 in fragmentary form, which is connected to a source of engine vacuum as with pressure tap line 52 and which is not communicated to a downstream line 54 until the engine operating temperature, as reflected in the coolant temperature, reaches a level indicating the engine has come up to temperature.

A temperature sensor vacuum switch 56 is provided which is connected having a vacuum chamber connected to the downstream line 54. The temperature sensor vacuum switch 56 may also be of a suitable commercially available type such as available from Borg-Worner, Model No. Sketch 101, and serves to pull in switching contacts upon opening of the PVS valve 48 and the engine operating temperature reaching its normal level.

This enables electrical connection to be completed via line 58 between the battery 38 and the terminal 40 of the injection pump 26 causing the pump to be turned on and water injection to proceed.

Accordingly, it can be seen that means are provided for precluding injection except above certain predetermined torque demand levels and only when engine temperatures have reached normal levels.

According to another aspect of the present invention, the tendency for seepage from the injection nozzle 12 is obviated. According to the system described, flow will not occur out of the injector nozzle 12 in the absence of the activation of the injection pump 26. However, some seepage could occur tending to drop down onto the engine throttle plate and potentially cause rusting of the component.

Such tendency is precluded by purging means which evacuates a short section of feed line included in the passage means 32 and from the injector nozzle 12.

Such purging means is constituted by a small electrically operated purge pump 62 and a purge line 64 filled to a Tee connection 66 just upstream of the passage 60 and to the intake side of the purge pump 62. The outlet of the purge pump 62 is connected to passage 68 which empties into the reservoir means 30.

Thus, whenever the purge pump 62 is activated, water is withdrawn from the injector nozzle 12 a short section of passage 60 and emptied into the reservoir tank 30. This approach precludes seepage since water cannot advance past the Tee connection 66 and yet a relatively small volume of water is required to refill the line upstream of the injector nozzle 12 such that water injection begins substantially immediately in the next operating cycle of water injection.

Means are provided for operating the purge pump 62 for a short purge cycle after each engine shutoff, i.e., a time period on the order of 10 seconds. Such control is achieved in the embodiment described by the use of a time delay relay 70 having internal contacts connected intermediate the battery 38 and the line 72 to the purge pump 62.

The time delay relay 70 is of a commercially available type, such as that available from Hoagland Company, Model No. 27-209, and includes a pair of contacts which are placed into the circuit such as to activate the purge pump 62 after the ignition key switch 74 is turned off. The time delay relay 70 is of a type when turning off the ignition key switch 74, a heated element is decativated which holds the main contacts for a predetermined time period until the heater element cools causing breaking of the main contacts in a manner well known to those skilled in the art.

If a purge system is not provided, an alternate embodiment is utilized as shown in FIG. 2, in which the injector nozzle 12 is inclined at a much greater angle to the vertical, i.e., 60° from the vertical, such as to minimize the drip or seepage of water into the venturi, such that seepage that does occur is directed right at the throttle plate such that the water tends to pass through the carburetor barrel and into the interior of the intake manifold 22 to minimize the rust causing effects thereof.

Accordingly, it can be seen that the above-recited objects of the present invention have been achieved by this system and method of water injection carried out thereby.

The part-time operation minimizes the water consumption while achieving the benefits of water injection, i.e., a reduction in knock, improvement of mileage by the advancement of the timing enabled thereby, a reduction in the required octane rating of the gasoline, reduction of the formation of nitrogen oxide and reduced engine temperature, and reduction of carbon deposits on the combustion chamber surfaces, valves and spark plugs. All of these effects have been carried out substantially completely notwithstanding the part-time operation of the water injection system.

Additionally, the system is comprised of simple, low cost and commercially available components such as to enable the system to be manufactured at relatively low cost and installed without major engine modifications.

At the same time, the corrosive effects of the water injection have been precluded by the purge system and included as part of the system. Also, the effects on drivability of water injection with cold engine conditions are resolved by the temperature responsive means precluding water injection prior to the engine reaching its normal operating temperature limit.

I claim:

1. A water injection system for an internal combustion engine having an air induction system including a carburetor having an intake and an air cleaner mounted upstream of said carburetor comprising:
water reservoir means for storing a quantity of water;
injection nozzle means for directing water into said air induction system and comprising a water spray nozzle mounted in said air cleaner directing water spray towards said carburetor intake;
pumping means controllably activated to pressurize water from said reservoir means;
passage means connecting said pumping means and said nozzle means enabling water flow to said nozzle means only when said pumping means is activated to cause said water spray into said air induction system;
control means responsive to levels of torque demand from said internal combustion engine to enable activation of said pumping means only when torque demand is above a predetermined level, whereby said water injection occurs only above said predetermined torque demand level;
purge means comprising a purge pump connected upstream of said injection nozzle means intermediately of said pump means, said purge pump having an inlet and an outlet, said inlet of said purge pump means connected to said passage means and said outlet of said purge pump connected to said water reservoir means; and means for activating said purge pump means during periods of nonuse of said injection system.

2. The water injection system according to claim 1 wherein said purge means further includes a purge line connected to said purge pump inlet via a Tee connection in said passage means located a short distance upstream of said water injection nozzle means.

3. The water injection system according to claim 2 wherein said purge pump control means includes means causing said purge pump to be activated for a predetermined period after said internal combustion engine operation ceases.

4. The water injection system according to claim 3 wherein said internal combustion engine is of the type including an ignition switch movable to off positions and wherein said purge control means includes means responsive to turning said ignition to said off position to activate said purge pump means for a predetermined time interval.

5. The water injection system according to claim 4 wherein said purge pump control means includes a time delay relay means activated upon turning of said ignition key to said off position to cause energization of said purge pump means for a predetermined interval.

6. A water injection system for an internal combustion engine having an air induction system comprising:
water reservoir means for storing a quantity of water;
injection nozzle means for directing water into said air induction system;
pumping means controllably activated to pressurize water from said reservoir means;
passage means connecting said pumping means and said nozzle means enabling water flow to said nozzle means only when said pumping means is activated to cause said water spray into said air induction system;
purge means including a purge pump having an inlet and an outlet, said inlet connected to said passage means upstream of said nozzle means and purge control means causing activation of said purge pump during periods of nonuse of said purge pump.

7. The water injection system according to claim 6 wherein said purge means further includes a purge line connected to said purge pump inlet via a Tee connection in said passage means located a short distance upstream of said water injection nozzle means.

8. The water injection system according to claim 7 wherein said purge pump control means includes means causing said purge pump to be activated for a predetermined period after said internal combustion engine operation ceases.

9. The water injection system according to claim 8 wherein said internal combustion engine is of the type including an ignition switch movable to off positions and wherein said purge control means includes means responsive to turning said ignition to said off position to activate said purge pump means for a predetermined time interval.

10. The water injection system according to claim 9 wherein said purge pump control means includes a time delay relay means activated upon turning of said ignition key to said off position to cause energization of said purge pump means for a predetermined interval.

* * * * *